United States Patent [19]

Chang

[11] Patent Number: 5,336,510

[45] Date of Patent: Aug. 9, 1994

[54] COLOR-STABLE SYRUP AND BEVERAGE COMPOSITIONS FORTIFIED WITH VITAMIN C, AND METHODS OF MAKING SUCH COMPOSITIONS

[75] Inventor: Pei K. Chang, Montrose, N.Y.

[73] Assignee: PepsiCo, Inc., Purchase, N.Y.

[21] Appl. No.: 40,592

[22] Filed: Mar. 31, 1993

[51] Int. Cl.$^5$ .............................................. A23L 1/27
[52] U.S. Cl. ........................................ 426/72; 426/262;
426/266; 426/311; 426/321; 426/540; 426/547;
426/590; 426/599; 426/648
[58] Field of Search ................. 426/72, 262, 266, 311,
426/321, 540, 547, 590, 599, 648

[56] References Cited

U.S. PATENT DOCUMENTS

| | | | |
|---|---|---|---|
| 3,652,290 | 3/1972 | Hammes et al. | 99/28 |
| 3,958,017 | 5/1976 | Morse et al. | 426/72 |
| 4,208,434 | 6/1980 | Iacobucci et al. | 426/72 |
| 4,992,282 | 2/1991 | Mehansho et al. | 426/72 |
| 5,002,779 | 3/1991 | Mehansho et al. | 426/72 |

*Primary Examiner*—Helen Pratt
*Attorney, Agent, or Firm*—Finnegan, Henderson, Farabow, Garrett & Dunner

[57] ABSTRACT

The invention is directed to color-stable syrup and beverage compositions fortified with vitamin C (ascorbic acid) which contain an azo food dye, such as FD&C Yellow #6. Riboflavin (vitamin B2) is employed as a color stabilizer and effectively prevents decoloring of the compositions, even upon prolonged periods of storage. The syrup and beverage formulations may optionally contain a glassy sodium polyphosphate, vitamin B6, vitamin B12, niacinamide, folic acid, calcium pantothenate, biotin, flavoring agents, sweeteners, acidic agents, etc.

20 Claims, No Drawings

1

COLOR-STABLE SYRUP AND BEVERAGE COMPOSITIONS FORTIFIED WITH VITAMIN C, AND METHODS OF MAKING SUCH COMPOSITIONS

BACKGROUND OF THE INVENTION

1. Field of the Invention

The present invention relates generally to formulations for and a method of making color-stable syrup concentrates and beverages. More particularly, the invention relates to preventing decoloring or fading of syrups and beverages containing vitamin C (L-ascorbic acid) and an azo food dye using riboflavin (vitamin B2) as a color stabilizer.

2. Description of Related Art

Depending on the ingredients employed, beverage formulators in the past have experienced color stability problems, such as decoloring or discoloring of beverage compositions. As used herein, "decoloring" means causing the fading or loss of color imparted by a dye to a solution, for example, bleaching of the dye. This term, "decoloring," is to be distinguished from "discoloring" as used herein, which means imparting an undesired color to a formulation.

Various approaches have been tried in the past to solve different problems relating to the color stability of beverage formulations, especially beverage compositions fortified with vitamins and/or minerals.

U.S. Pat. No. 4,992,282 to Mehansho et al. is directed to problems caused by the presence of both vitamins and minerals, such as iron, in beverages. Iron supplements tend to discolor foodstuffs, i.e., iron sources tend to impart an undesirable color to beverage compositions (see also U.S. Pat. No. 5,002,779 to Mehansho et al.). The Mehansho et al. ('282) beverages are fortified with vitamin C, riboflavin, vitamin A, iron and calcium compounds, and may include other vitamins, such as vitamin B6, niacin and vitamin B12. The vitamin and mineral ingredients can be formulated in concentrated syrups which may contain, in addition to water, sugars, flavors and colors. The syrup compositions are diluted with water to make the final low-pH beverages.

Mehansho et al. ('282) discuss the problem of discoloration of beverages fortified with iron, rather than the problem of decoloring of beverage compositions fortified with vitamin C. However, others have attempted to solve the color instability problem, i.e., the fading of the dyes in beverages, resulting from the chemical incompatibility of certain food dyes in the presence of vitamin C.

For example, U.S. Pat. No. 4,208,434 to Iacobucci et al. is directed to forming color-stable food compositions which contain an anthocyanin pigment and vitamin C. Anthocyanin pigments are incompatible with ascorbic acid. Iacobucci et al. attempt to solve this problem by using certain ascorbic acid derivatives which do not bleach anthocyanin pigments as rapidly as ascorbic acid. Thus, Iacobucci et al. deal with a color-stability problem caused by the use of anthocyanin pigments in combination with ascorbic acid, rather than the use of azo dyes in combination with vitamin C.

Solutions containing vitamin C and azo dyes have been known to discolor over time. Difficulty has been encountered in maintaining the color over long periods of time of beverages fortified with ascorbic acid, such as sport-type drinks formulated to help optimize the performance of athletes. Ethylenediaminetetraacetic acid (EDTA) helps stabilize the color of beverages containing an azo dye and vitamin C. However, under current U.S. regulations, EDTA cannot be used in still beverages. Thus, other ways to stabilize the color of beverages fortified with vitamin C are needed.

U.S. Pat. No. 3,958,017 to Morse et al. is directed to the use of cysteine to form color-stable beverages containing vitamin C, a food dye such as an azo dye, and optionally, iron. U.S. Pat. No. 3,652,290 to Hammes et al. discloses the use of histidine, glycine or methionine similarly to protect vitamin C in beverages containing a food dye such as an azo dye, and thus improve color stability.

Although Morse et al. and Hammes et al. suggest an approach to forming color-stable compositions containing both an azo dye and vitamin C, it would be desirable to produce syrup and beverage formulations containing an azo dye and vitamin C with even better color stability. Moreover, it would be desirable to form colorfast syrup and beverage formulations containing an azo dye and vitamin C without the necessity of using cysteine, histidine, glycine or methionine amino acids. It would also be desirable to find a color stabilizer which provides for colorfast azo-dyed beverage formulations fortified with vitamin C which even contain an additive such as a glassy sodium polyphosphate (e.g. a compound of the formula $(HPO_3)_n \cdot Na_2O$ where $n=13$ to 21) which, in the absence of the color stabilizer, undesirably accelerates the fading or decoloring of the formulation.

SUMMARY OF THE INVENTION

Thus, an object of the present invention is to provide improved color-stable syrups and beverages which contain an azo food dye and vitamin C.

Additionally, an object of this invention is to provide colorfast syrup and beverage formulations fortified with vitamin C and colored with an azo food dye, without using EDTA, cysteine, histidine, glycine or methionine in the formulation.

It is still another object o#the present invention to provide color-stable syrup and beverage compositions comprising water, vitamin C, an azo food dye and, optionally, one or more conventional additives such as sweeteners and flavorings.

It is an additional object of the instant invention to provide a method of formulating improved colorfast syrup and beverage compositions comprising water, vitamin C and at least one azo dye and a color stabilizer.

It is a further object of this invention is to provide color-stable syrup and beverage formulations containing water, an azo dye, vitamin C and a glassy sodium polyphosphate having an average chain length 13–21, i.e. a compound of the formula $(HPO_3)_n \cdot Na_2O$ where $n=13$–21 such as sodium hexametaphosphate.

The foregoing objects and advantages have been achieved in accordance with the present invention by adding a color stabilizer containing or consisting essentially of riboflavin to syrup and beverage compositions containing an azo food dye and vitamin C. In one aspect, the present invention is directed to compositions for formulating syrups and beverages fortified with vitamin C and containing an azo dye and riboflavin. In accordance with the present invention, the riboflavin can be added to a syrup or a beverage alone or in a premix containing other additives, such as vitamins, minerals and azo food dyes, to stabilize the color of the syrup or beverage. For example, the riboflavin can be added to the syrup or beverage in a vitamin premix containing vitamins and minerals.

In another aspect, the present invention is directed to a method for formulating a color-stable beverage, comprising forming a syrup composition containing water, vitamin C, an azo food dye and a color-stabilizing amount of riboflavin, and diluting the syrup composition with water.

Additional objects and advantages of the invention will be set forth in part in the detailed description of exemplary embodiments which follows, and in part will be apparent from the description, or may be learned through routine practice of the invention.

DESCRIPTION OF PREFERRED EMBODIMENTS

Azo dyes are a class of synthetic dyes having —N=N— as a chromophore group. These dyes are produced by reacting diazonium salts with tertiary amines or phenols (hydroxy-benzenes). By varying the chemical composition, acidic, basic, direct or mordant azo dyes may be produced. Exemplary azo dyes usable in the inventive syrups and beverages are FDA-approved food dyes such as FD&C Yellow #5 (trisodium salt of 3-carboxy-5-hydroxy-1-p-sulfophenyl-4-sulfophenylazopyrazole), FD&C Yellow #6 (disodium salt of 1-p-sulfophenylazo-2-naphthol-6-sulfonic acid) and FD&C Red #40 (disodium salt of 6-hydroxy-5[(2-methoxy-5-methyl-4-sulfophenyl)azo]-2-naphthalene-sulfonic acid) and the like.

In accordance with the present invention, it has been discovered that the addition of riboflavin (vitamin B2) or a color-stabilizing composition containing riboflavin, counteracts the decoloring effect of vitamin C when combined in solution with azo dyes.

Although there is no intention to be bound by any theory, a redox mechanism may explain the decoloring of solutions containing vitamin C and an azo dye. Riboflavin may, therefore, enhance color stability by protecting the azo dye from being chemically reduced by vitamin C.

Azo compounds are prone to chemical reduction at the nitrogen-nitrogen double bond by reducing agents, such as stannous chloride with concentrated hydrochloric acid and sodium hydrosulfide dihydrate. Vitamin C is a strong reducing agent due to the enediol group. Therefore, a possible mechanism explaining the bleaching effect of vitamin C on azo dyes is that the hydrogen ions of the vitamin C molecule chemically reduce the nitrogen-nitrogen double bond of the azo dye, rendering it colorless.

According to this possible mechanism, when riboflavin is added to the medium, the riboflavin accepts the hydrogen ions from the vitamin C molecule, and then transfers the hydrogen ions to oxygen, forming water, dehydro-L-ascorbic acid and reduced riboflavin. The reduced riboflavin then combines with residual oxygen to form water and regenerated riboflavin. Therefore, as long as there is about a stoichiometric or excess amount of riboflavin present in relation to the amount of vitamin C, the combination of riboflavin with vitamin C should minimize decolorization of the azo dye.

Again, the present invention as defined by the appended claims is not intended to be limited in scope by the above-described possible theory of operation of the chemical constituents.

Reference will now be made in detail to the present preferred embodiments which are exemplary of the invention.

In a preferred embodiment, the color stabilizer consists essentially of riboflavin. In an alternative embodiment, the color-stabilizing riboflavin may be premixed with at least one member selected from vitamin B6, vitamin B12, niacinamide, folic acid, calcium pantothenate and biotin. Preferably, the color-stabilizing premix contains riboflavin, vitamin B6, vitamin B12, niacinamide, folic acid, calcium pantothenate and biotin.

In general, a color-stabilizing amount, i.e., an amount sufficient to substantially lessen or prevent the fading or loss of color imparted by the azo food dye to the syrup or beverage containing vitamin C, of riboflavin is used. As explained above, a preferred amount of riboflavin is the stoichiometric amount of riboflavin relative to the amount of vitamin C. However, an excess of riboflavin may be used in accordance with the present invention, as long as there is no adverse effect on taste and like properties of the syrup or beverage formulation.

Preferred azo dyes which may be used in accordance with the present invention are the FDA-approved azo food dyes, such as FD&C Yellow #5, FD&C Yellow #6 and FD&C Red #40 and the like. Other azo food dyes which are unstable in the presence of vitamin C, suitable for the intended use, may also be selected by those skilled in the art. Additionally, a mixture of azo food dyes or an azo food dye in combination with other conventional food dyes and food colorants may be used in the present invention. The amount of azo food dye used is generally selected based on the intensity of the color desired for the particular syrup or beverage, and can be readily determined by one skilled in the art.

The amount of vitamin C is selected to meet the desired RDA percentage. Preferably, an amount of vitamin C which yields at least 100% of the RDA for vitamin C in 8 fluid ounces of the final beverage product is used.

Although preservatives may be used if desired, it is preferred that the syrup and beverage compositions are free of conventional preservatives.

According to the present invention, the syrup and beverage formulations contain water, azo food dye, vitamin C and riboflavin. Other ingredients in the syrups and beverages of the present invention can vary to suit the particular type of end product desired. The following listing of exemplary syrup and beverage ingredients is illustrative of the present invention.

Preferred syrups in accordance with the invention contain: 0.1% to 0.17% by wt. of vitamin C; 30 ppm to 350 ppm (parts per million) of an azo dye; 4 ppm to 6 ppm of riboflavin; and 92% to 97% by wt. water.

In addition, the syrups may contain the following: 5–10 ppm vitamin B6, 15–30 ppb (parts per billion) vitamin B12, 45–65 ppm niacinamide, 1–3 ppm folic acid, 20–40 ppm calcium pantothenate and 0.5–1.5 ppm biotin. Preferably, these ingredients are mixed with the riboflavin to form a color-stabilizing premix which is added to the syrup prior to dilution to the final beverage product.

Other optional syrup ingredients include: 0.1–0.25% w/w of a glassy sodium polyphosphate (average chain length, n, of 13–21 in the formula $(HPO_3)_n \cdot Na_2O$), such as sodium hexametaphosphate; 0.3–1.5% based on the volume of the syrup of one or more acidic agents approved for food use, such as phosphoric acid, citric acid and malic acid; a natural or artificial sweetening agent, such as high-fructose corn syrup and/or sucrose (40–50% solids w/w), or aspartame (0.2–0.3% w/w); 0.5–1.0% w/w of a natural or artificial flavoring agent; 0.03–0.3% w/w of a mineral salt such as calcium chloride or sodium chloride; and 0.1–0.2% w/w of an electrolyte such as monopotassium phosphate.

Preferably, the above-listed ingredients are added to the syrup formulation prior to its dilution with water to form the final beverage product. However, the ingredients may be added to the beverage after the concentrated syrup has been diluted with water to the final concentration. Alternatively, the ingredients may be added together in a single batch to produce the final beverage composition without formulating a syrup concentrate. Conventional mixing and blending techniques may be used to blend, mix and/or dilute the syrups and beverages of the present invention.

In embodiments of the present invention employing a dry premixture of ingredients for admixture with other ingredients and dilution with water to form a syrup or beverage, the premix ingredients may be ground or pulverized and/or mixed together using any suitable equipment known in the art.

Preferred beverage compositions according to the invention contain the preferred concentrated syrups diluted with water at a volume ratio of from about 1:3.5 to 1:4.5. More preferably, the beverages are prepared by adding about 1 part syrup to 4 parts water on a volume basis.

Exemplary fortified sport-type beverages in accordance with the invention may be prepared from the following 5000-ml syrup formulations:

TABLE I

| | Sport Drink Formulations | | |
| --- | --- | --- | --- |
| | | (grams) | |
| Ingredient | Syrup A | Syrup B | Syrup C |
| Orange flavor | 53.43 | — | — |
| Fruit punch flavor | — | 33.64 | — |
| Lemon-lime flavor | — | — | 43.74 |
| Cloud* | 28.98 | 28.98 | 28.98 |
| Phosphoric acid | 14.80 | 14.80 | 14.80 |
| Malic acid | 2.50 | 2.50 | 2.50 |
| Citric acid | 1.66 | 1.66 | 1.66 |
| Sodium chloride | 11.65 | 11.65 | 11.65 |
| Calcium chloride | 1.56 | 1.56 | 1.56 |
| Monopotassium phosphate | 7.99 | 7.99 | 7.99 |
| High-fructose corn syrup (HFCS), 77° Brix | 2636.0 | 2944.0 | 2636.0 |
| FD&C Yellow #5 | — | — | 0.17 |
| FD&C Yellow #6 | 0.625 | — | — |
| FD&C Red #40 | — | 1.65 | — |
| Treated Water | Q.S. to 5000 ml | Q.S. to 5000 ml | Q.S. to 5000 ml |

*suitable cloud agent added to provide turbidity

Syrup A in Table I is a base formulation for orange syrup. A base formulation for fruit punch syrup is Syrup B. Syrup C is a base composition for lemon-lime syrup.

To 5000 ml of one of the above base syrup formulations, a sufficient amount of vitamin C is added to meet the desired RDA percentage upon storage. Preferably, 6.76 g ascorbic acid are added to a 5000-ml batch of syrup base prior to formulating into the final beverage to yield a vitamin C content of 270 ppm in the beverage.

Additionally, 24.80 mg riboflavin is added to the 5000-ml batch of the syrup fortified with vitamin C to form a color-stabilized syrup. In an alternative embodiment, 10.42 g of a premix containing 24.80 mg riboflavin, 41.5 mg vitamin B6, 112.5 μg vitamin B12, 291.5 mg niacinamide, 8.25 mg folic acid, 156.25 mg calcium pantothenate and 3.75 mg biotin is added to the 5000-ml batch of the syrup fortified with vitamin C to form a color-stabilized syrup.

If desired, 5.00 g of a glassy sodium polyphosphate compound (spp) can be added to 5000 ml of a base syrup formulation.

A glassy sodium polyphosphate compound (spp) with an average chain length (n in the formula $(HPO_3)_n \cdot Na_2O$) of from 13 to 21, e.g. sodium hexametaphosphate, is preferably added to increase the microstability of the acidic beverage. In the absence of vitamin C, spp causes no decolorization of beverage and syrup formulations containing azo food dyes. However, in the presence of ascorbic acid, spp accelerates the fading or decoloring of the beverage or syrup containing an azo dye. The addition of the riboflavin color stabilizer to azo-dyed syrups and beverages containing spp and vitamin C negates the adverse decoloring effects of the spp/vitamin C combination.

Ethylenediaminetetraacetic acid (EDTA) may be added to the azo-dyed syrup and beverage formulations, e.g., at about 25 ppm, to chelate or sequester copper ions and thus prevent the formation of copper-ascorbate complexes which can cause color problems. However, EDTA is preferably absent from still beverage formulations because of current FDA regulations.

A preferred low-pH (e.g., pH=2.5, titratable acidity=15) still beverage may be prepared by diluting one volume of syrup with four volumes of treated ( i.e., purified ) water . Such a beverage is colorfast, even when spp is added. The following Examples illustrate beverages in accordance with the present invention.

Example 1A

Example 1A of the invention was prepared by adding vitamin C at a level yielding 270 ppm in the final beverage composition and 24.80 mg riboflavin (vitamin B2) to 5000 ml of Syrup A, and then diluting 1 part by volume of the syrup with 4 parts by volume of treated water.

Example 1B

Inventive Example 1B was prepared in the same manner as Example 1A, except Syrup B was used instead of Syrup A.

Example 1C

Similarly, Example 1C of the invention was prepared in the same manner as Example 1A, except Syrup C was used in place of Syrup A.

Example 2A

Example 2A was prepared in a manner similar to that for Example 1A, except instead of riboflavin alone, a premix was used which contained 24.80 mg riboflavin, 41.5 mg vitamin B6, 112.5 μg vitamin B12, 291.5 mg niacinamide, 8.25 mg folic acid, 156.25 mg calcium pantothenate and 3.75 mg biotin.

Example 2B

Inventive Example 2B was prepared in the same manner as Example 2A, except Syrup B was used instead of Syrup A.

Example 2C

Similarly, Example 2C was prepared in the same manner as Example 2A, except Syrup C was used in place of Syrup A.

Example 3A

Inventive Example 3A was prepared as in Example 1A, except HEXAPHOS® (a sodium hexametaphosphate product manufactured by FMC) was also added to the syrup prior to dilution to yield 300 ppm of spp in the beverage.

Example 3B

Example 3B of the invention was prepared in the same manner as Example 3A, except Syrup B was used instead of Syrup A.

Example 3C

Example 3C was prepared in the same manner as Example 3A, except Syrup C was used in place of Syrup A.

Example 4A

Inventive Example 4A was prepared as in Example 2A using the same multi-vitamin premix containing riboflavin, except HEXAPHOS® was added to the syrup prior to dilution to yield 300 ppm of spp in the beverage.

Example 4B

Example 4B of the invention was prepared in the same manner as Example 4A, except Syrup B was used instead of Syrup A.

Example 4C

Example 4C was prepared in the same manner as Example 4A, except Syrup C was used in place of Syrup A.

For comparison with the inventive examples, comparative examples were prepared as described below.

Examples IA–IC

Examples IA, IB and IC were prepared without vitamin C to serve as color controls. To prepare control Example IA, 5000 ml of Syrup A were diluted with purified water at a ratio of 1 part by volume syrup to 4 parts by volume water. Example IB was analogously prepared, except 1 part by volume of Syrup B was diluted with 4 parts by volume of water. Similarly, control Example IC was prepared by diluting 1 part by volume of the base Syrup C with 4 parts by volume of water.

Examples IIA–IIC

Examples IIA, IIB and IIC were prepared with vitamin C for comparative purposes. Specifically, Examples IIA, IIB and IIC were prepared in a manner similar to that used for Examples IA, IB and IC, respectively, except vitamin C was added to the syrups, yielding beverage compositions containing 270 ppm of vitamin C.

Example IIIA–IIIC

Examples IIIA–IIIC are beverage formulations containing a vitamin C/spp combination. Examples IIIA, IIIB and IIIC were prepared as in Examples IIA, IIB and IIC, respectively, except HEXAPHOS® was additionally added to the syrups to yield 300 ppm of spp in the beverage compositions.

Example IVA

For comparison with the color stabilities of the examples in accordance with the present invention, Example IVA was prepared in a manner analogous to Examples 1A, except cysteine was used in place of riboflavin. The amount of cysteine in each of these beverage compositions was approximately 2.7 to 5.4 ppm.

The above-noted inventive and comparative examples were stored at 90° F. After storage periods of one month and three months, the examples were visually compared with the corresponding control examples to determine the extent of color fading.

The results of the color stability tests are summarized in Table II below. In the table, "a" means no fading of color observed, "b" means very slight fading of color observed, "c" means slight fading of color observed, "d" means moderate fading of color observed and "e" means extreme fading of color observed.

TABLE II

| Example | Color Stability Tests | |
|---|---|---|
| | Fading after 1 mo. | Fading after 3 mos. |
| 1A | a | a |
| 1B | a | a |
| 1C | a | a |
| 2A | a | a |
| 2B | a | a |
| 2C | a | a |
| 3A | a | a |
| 3B | a | a |
| 3C | a | a |
| 4A | a | a |
| 4B | a | a |
| 4C | a | a |
| IA | a | a |
| IB | a | a |
| IC | a | a |
| IIA | c | c |
| IIB | a | a |
| IIC | d | d |
| IIIA | d | d |
| IIIB | b | b |
| IIIC | e | e |
| IVA | c | c |

The above-tabulated results show that the present invention achieves highly color-stable beverage formulations. Moreover, as evident from a comparison of Examples 1A and 2A with Example IVA, the inventive color stabilizers are more effective than cysteine. When an azo dye highly incompatible with vitamin C is utilized, such as FD&C Yellow #6, the use of riboflavin in accordance with the invention advantageously achieves color stability, whereas the use of cysteine results in color fading.

It will be apparent to those skilled in the art that various modifications and variations can be made in the present invention without departing from the scope or spirit of the invention. For example, still or carbonated beverages may be made in accordance with the invention. In addition to sport-type drinks or beverages, other types of beverages may be color-stabilized by means of the present invention. Further, the color-stabilized compositions of the invention may be used to produce foodstuffs fortified with vitamin C and colored with an azo dye other than beverages or drinks, such as Popsicle-type confections, gelatins and the like.

Thus, other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A composition for formulating a colored syrup or beverage, the composition comprising vitamin C, an azo food dye and a color-stabilizing amount of riboflavin.

2. A composition as recited in claim 1, further comprising an ingredient selected from the group consisting of vitamin B6 and vitamin B12.

3. A composition as recited in claim 1, further comprising and ingredient selected from the group consisting of a sweetener, a flavoring agent and phosphoric acid.

4. A composition as recited in claim 1, further comprising a glassy sodium polyphosphate compound of the formula $(HPO_3)_n \cdot Na_2O$, wherein n is an integer of from 13 to 21.

5. A composition as recited in claim 1, further comprising an ingredient selected from the group consisting of vitamin B6, vitamin B12, niacinamide, folic acid, calcium pantothenate and biotin.

6. A composition as recited in claim 1, wherein the azo food dye is selected from the group consisting of FD&C Yellow #5, FD&C Yellow #6 and FD&C Red #40.

7. A composition as recited in claim 1, further comprising water in an amount of from 92 to 97 percent by weight, wherein the vitamin C is present in an amount of from 0.1 to 0.17 percent by weight, the azo food dye is present in an amount of from 30 to 350 ppm, and the color-stabilizing amount of riboflavin is from 4 to 6 ppm.

8. A composition as recited in claim 7, further comprising 5 to 10 ppm of vitamin B6, 15 to 30 ppb of vitamin B12, 45 to 65 ppm of niacinamide, 1 to 3 ppm of folic acid, 20 to 40 ppm of calcium pantothenate, and 0.5 to 1.5 ppm of biotin.

9. A composition for preparing a color-stable foodstuff, the composition comprising water, vitamin C, an azo food dye and a color stabilizer consisting essentially of riboflavin.

10. A composition as recited in claim 9, further comprising a member selected from the group consisting of vitamin B6, vitamin B12, niacinamide, folic acid, calcium pantothenate and biotin.

11. A composition as recited in claim 9, further comprising a glassy sodium polyphosphate compound of the formula $(HPO_3)_n \cdot Na_2O$, wherein n is an integer of from 13 to 21.

12. A composition as recited in claim 9, further comprising a sweetener.

13. A composition as recited in claim 9, further comprising a flavoring agent.

14. A composition as recited in claim 9, wherein the azo food dye is selected from the group consisting of FD&C Yellow #5, FD&C Yellow #6 and FD&C Red #40.

15. A composition as recited in claim 9, wherein the composition is acidic.

16. A method for formulating a color-stable beverage, comprising forming a syrup composition comprising water, vitamin C, an azo food dye and a color-stabilizing amount of riboflavin, and diluting the syrup composition with water.

17. A method as recited in claim 16, wherein the syrup composition further comprises a glassy sodium polyphosphate compound of the formula $(HPO_3)_n \cdot Na_2O$, wherein n is an integer of from 13 to 21.

18. A method as recited in claim 16, wherein the syrup composition further comprises an ingredient selected from the group consisting of vitamin B6, vitamin B12, niacinamide, folic acid, calcium pantothenate and biotin.

19. A method as recited in claim 18, wherein the azo food dye is selected from the group consisting of FD&C Yellow #5, FD&C Yellow #6 and FD&C Red #40.

20. A method as recited in claim 16, wherein the syrup composition further comprises an ingredient selected from the group consisting of a sweetener, a flavoring agent and phosphoric acid.

* * * * *